JOHN BARNES, OF ROCKFORD, ILLINOIS.

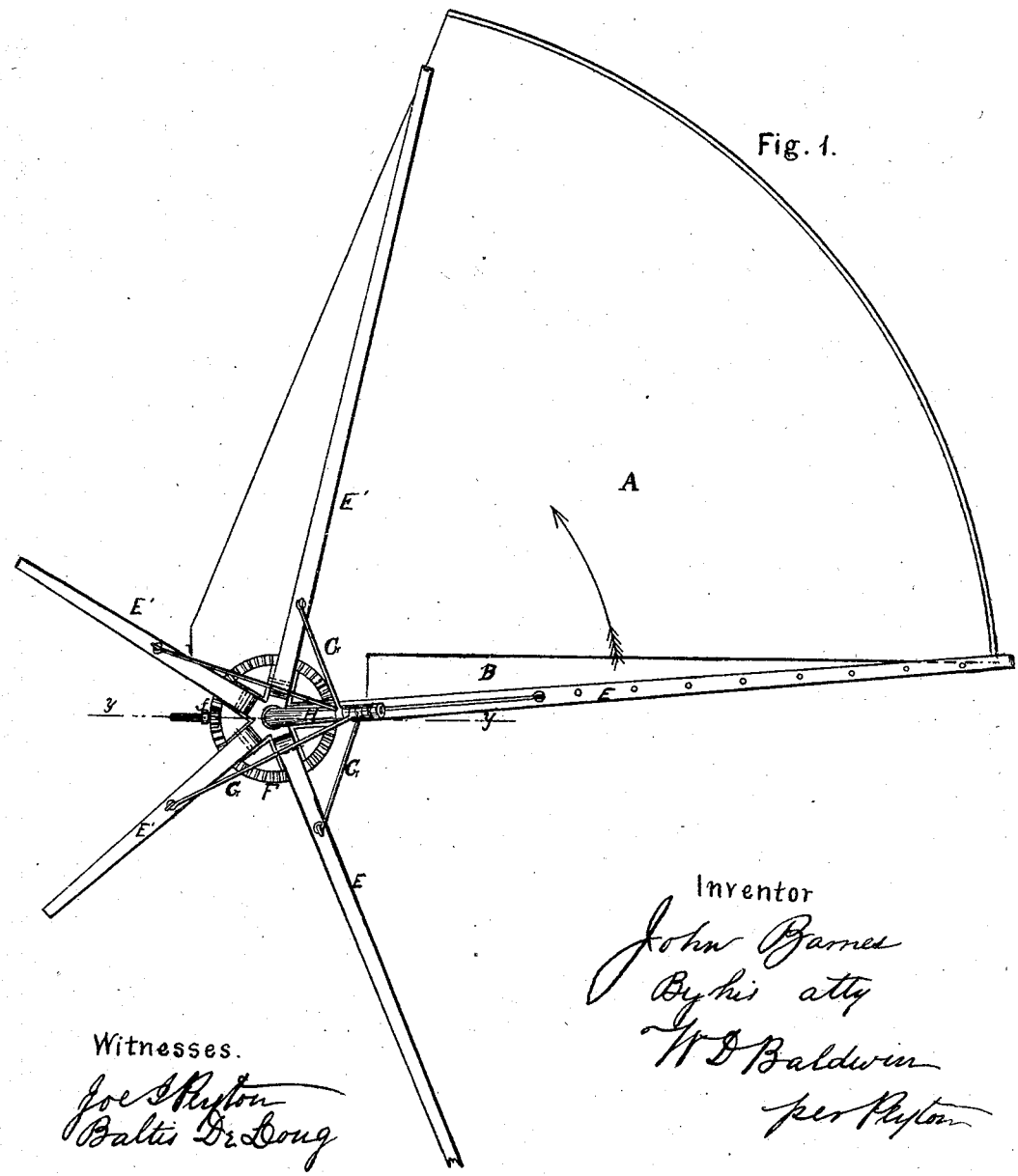

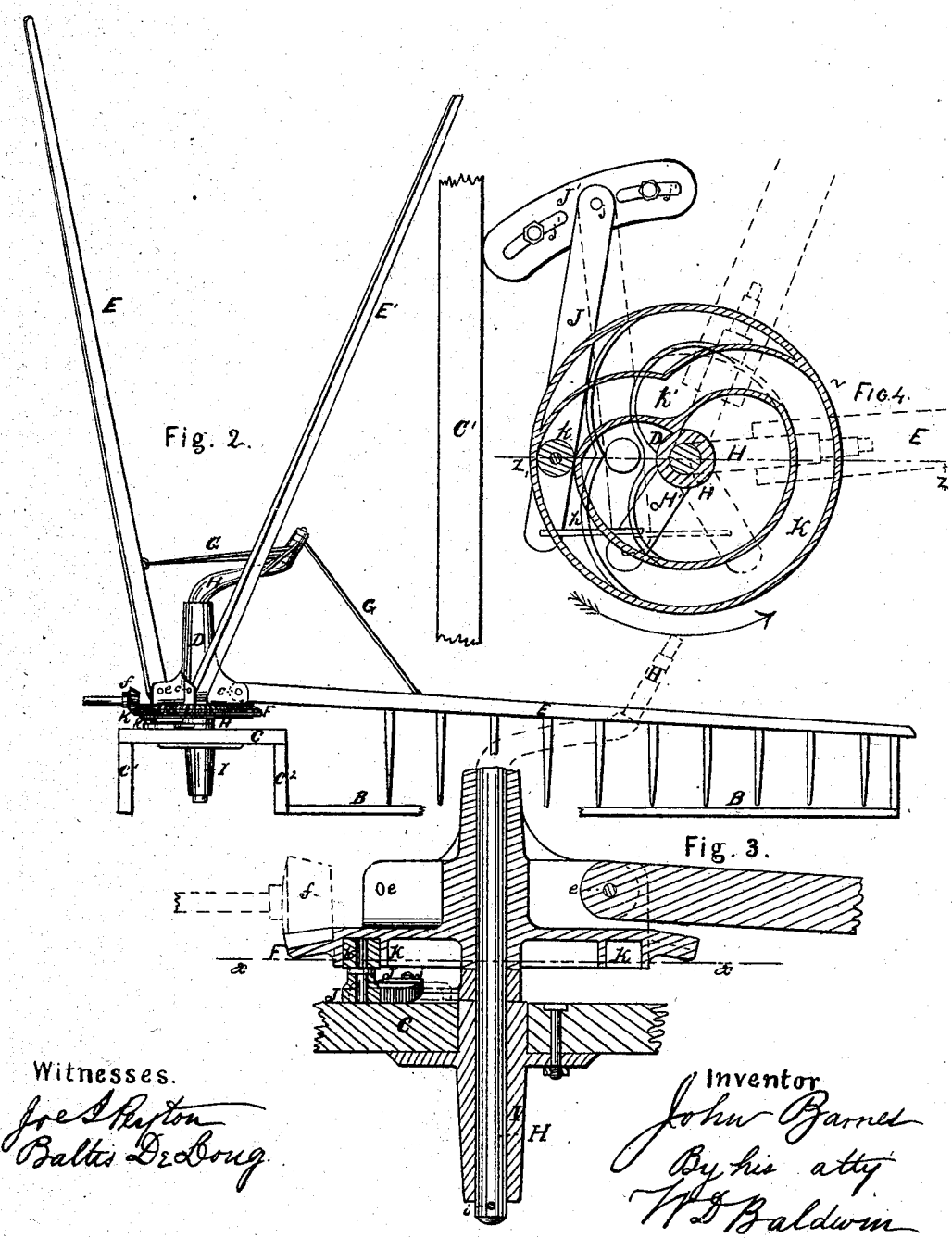

*Letters Patent No. 85,723, dated January 12, 1869.*

IMPROVEMENT IN HARVESTER-RAKES.

The Schedule referred to in these Letters Patent and making part of the same.

*To all whom it may concern:*

Be it known that I, JOHN BARNES, of Rockford, in the county of Winnebago, and State of Illinois, have invented certain new and useful Improvements in Harvester-Rakes, of which the following is a full, clear, and exact description.

My invention relates to that class of harvester-rakes in which a series of combined rake and reel-arms is caused successively and continuously to traverse over the platform in a circular path.

Its object is to dispense with much of the gearing and guiding-mechanism heretofore employed, and also promptly to lift the rake from the platform after the gavel has been removed. To these ends, The improvements herein claimed consist—

First, in a novel method of combining a continuously-revolving rake with an oscillating guide-post, which lifts the rake after the discharge of the gavel.

Second, in a novel method of combining a series of continuously-rotating rising and falling combined rake and reel-arms, by linked connections with a guide-post, oscillating intermittently on an axis coincident with that of the rake and reel-arms, and bent at its upper end, to which the arms are linked, to an angle of about forty-five degrees, whereby each arm, in succession, is brought down in front of the cutters, to sweep back the standing grain, and is turned up nearly vertically when moving around the stubble-side of the axis of rotation.

Third, in a novel method of combining a continuously-rotating cam-track on the shaft on which the rake revolves with a pitman or crank on the guide-post, so that it may be oscillated at the proper periods with respect to the rake.

In the accompanying drawings, which exemplify one practical mode of carrying out my invention, Figure 1 represents a plan or top view of so much of the rake as is necessary to illustrate the invention.

Figure 2 represents a view in elevation of the same, as seen from the front.

Figure 3 represents a vertical central section through the rake at the line $y\ y$ of fig. 1.

Figure 4 represents a horizontal section through the same at the line $x\ x$ of fig. 3.

My improvements are readily applicable to almost any of the harvesters of the present day, whether one or two-wheeled, front or rear-cut, or with jointed or rigid finger-beams.

A very convenient machine to which to apply this rake is shown in an application for a patent for a harvester filed by me simultaneously with this one.

In the drawings, A represents the platform, and B, the finger-beam.

The rake-mechanism is mounted, by preference, on a raised plank or stage, C, (resting upon beams $C^1\ C^2$ upon the inner end of the finger-beam or platform,) in such manner as to bring the axis of the rake slightly in front of the cutters.

The reel and rake-arms E E' are pivoted at their inner ends to play vertically in sockets $e$, on a revolving hub, D, which is rotated by a gear-wheel, F, driven by a pinion, $f$, from the main axle by a chain or other proper gearing.

The rake and reel-arms are connected, by link-rods G, with the upper end of a guide-post, H, which, in this instance, is inclined to an angle of about thirty-five degrees from the perpendicular.

This post passes down through the hub D and through a socket, I, by preference secured to the under side of the staging C. A pin, $i$, through the bottom of the guide-post, holds all the parts securely together.

The post turns freely in its socket, and has an arm or crank, H', on it, just above the staging C, as shown in figs. 2 and 4.

This crank is connected, by a link-rod, $h$, with an oscillating arm, J, pivoted to play horizontally on a pivot, $j$, on a slotted adjusting-bracket, J', secured upon the platform, or upon an extension of the finger-beam.

A friction-roller, $k$, on this oscillating arm, travels in a cam-track, K, secured upon and revolving with the hub D. The shape of this cam-track, shown in fig. 4, is such that, at proper intervals, the guide-post is caused to oscillate on its axis, in a manner hereinafter explained.

The motion of the guide-post may be varied, by changing the link $h$ from one of a series of holes in the crank H' into another, or by a slot and set-screw.

This adjustment may be regulated to a still greater extent by means of the slots and set-screws $j'$ in the bracket J'.

It is obvious that the cam-track might be attached to the guide-post, and the friction-roller made to travel with the hub D, and work successfully, but I prefer the construction I have described.

The angle of the guide-post must be varied according to the perpendicular elevation to be given to the arms, to pass over the driver's head, and to the suddenness with which it is desired to raise the rake from the gavel.

The operation of the machine will best be understood by reference to fig. 4.

The cam-track and arms revolve in the direction shown by the arrow. The part of the cam-track from 1 to 2 is concentric with the hub D; consequently, while the friction-roller $k$ is in that part of the track, the guide-post H remains about in the same vertical plane with the finger-beam, as shown in figs. 1 and 2. As the rake and reel-arms revolve continuously with the hub, they are successively brought down in front of the cutters, to press the standing grain back upon the platform, swept over the platform, and then lifted nearly vertically, and pass forward again.

The links G, it will be observed, not only lift the arms on their forward movement, but hold them down near the platform when passing over it.

I have found that much less power is required to drive the arms under this arrangement than when friction-rollers on the arms, working in cam-guides, are employed, as the friction of the rollers on the cam, when holding the arms down, is very great.

The mechanism is so arranged that the friction-roller occupies the position on the cam-track shown in fig. 4 at the moment the rake descends upon the platform. As the rake sweeps the platform, the friction-roller traverses the back part k' of the cam-track, in consequence of which movement the guide-post H is caused to move backward with the same speed as the rake. By the time the gavel is discharged, the parts are in the position shown in red lines in fig. 4. At this moment the friction-roller begins to diverge from the axis of the hub, and the guide-post is quickly moved forward to its normal position; this throws up the rake quickly from the platform, and prevents the gavel from being scattered.

When the guide-post is over the finger-beam, the beaters rise from the platform sooner than when it is swept back.

What I claim as my invention, and desire to secure by Letters Patent, is—

1. The combination, substantially as set forth, of a continuously-revolving rake with an oscillating guide-post.

2. The combination, in a harvester-rake, of a series of continuously-rotating, rising and falling, combined reel and rake-arms, revolving on an axis vertical, or nearly so, with a guide-post, oscillating intermittently on an axis conentric with the rake and reel-arms, and connected therewith by linked connections, whereby I dispense with cams and complex gearing.

3. The combination, substantially as set forth, with a continuously-revolving rake, of a revolving cam-track and an oscillating guide-post.

In testimony whereof, I have hereunto subscribed my name.

JOHN BARNES.

Witnesses:
EDM. F. BROWN,
JOE I. PEYTON.